B. F. MOYE.
DIRIGIBLE HEADLIGHT.
APPLICATION FILED JUNE 23, 1913.
1,081,398.
Patented Dec. 16, 1913.
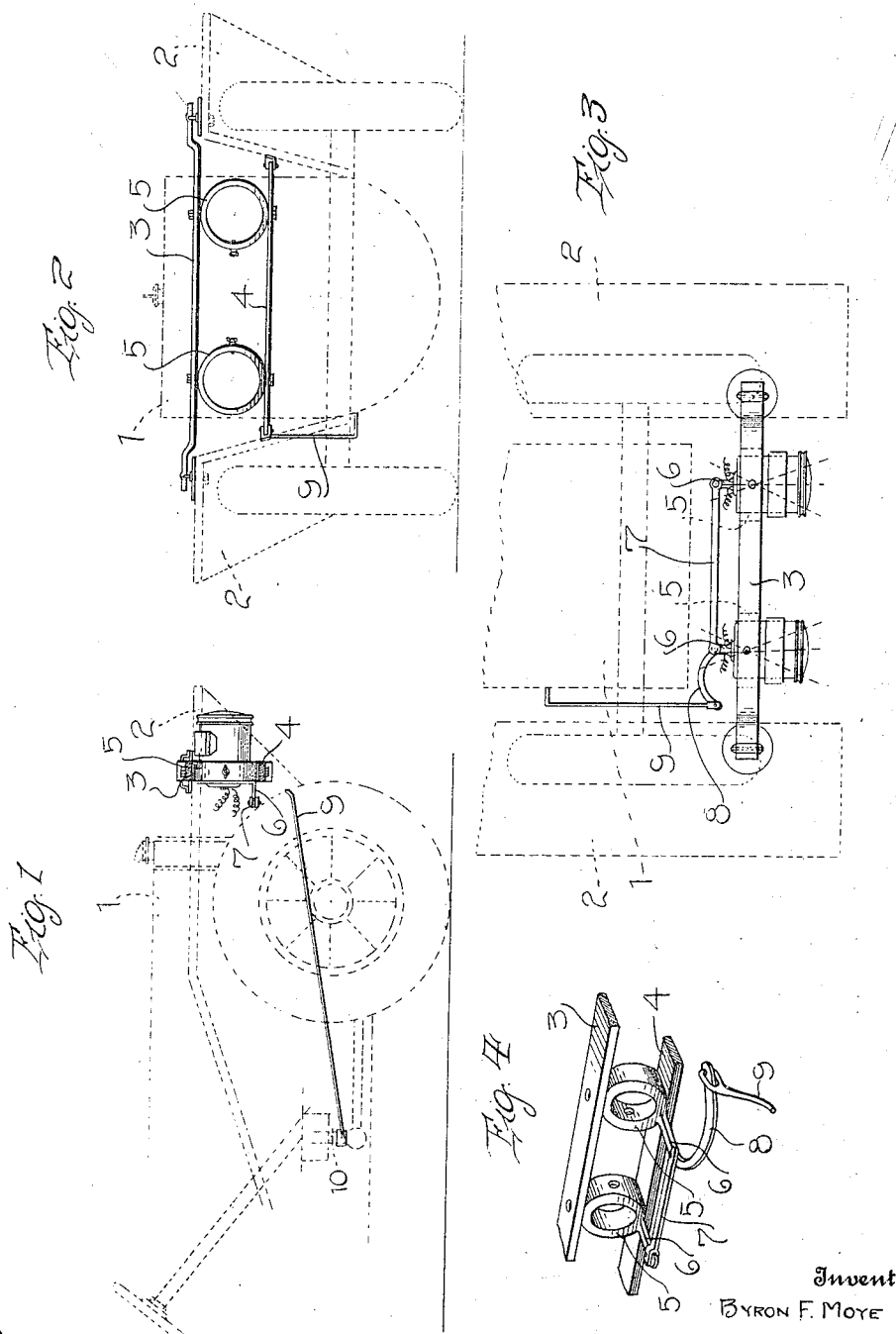
Inventor
BYRON F. MOYE
Witnesses
Robert M. Sutphen
A. I. Hind
By Watson E. Coleman
Attorney

UNITED STATES PATENT OFFICE.

BYRON F. MOYE, OF DUPUYER, MONTANA.

DIRIGIBLE HEADLIGHT.

1,081,398.  Specification of Letters Patent.  Patented Dec. 16, 1913.

Application filed June 23, 1913.   Serial No. 775,378.

*To all whom it may concern:*

Be it known that I, BYRON F. MOYE, a citizen of the United States, residing at Dupuyer, in the county of Teton and State of Montana, have invented certain new and useful Improvements in Dirigible Headlights, of which the following is a specification, reference being had to the accompanying drawings.

This invention relates to new and useful improvements in automatic controlling devices for automobile lamps and my object is to provide a simple and efficient device of this character which will positively direct the head lights in the path to be taken by the front wheels of the vehicle.

A further object of the invention resides in providing a substantial frame supported between the fenders of a vehicle and a still further object resides in providing frames or the like for the lamps, which frames are pivotally supported in the main frame of the device.

A still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a side elevation partly in section showing my device applied to use on an automobile. Fig. 2 is a front elevation thereof. Fig. 3 is a plan view of the same; and Fig. 4 is a fragmentary perspective view of the device.

In describing my invention, I shall refer to the drawing in which similar reference characters designate corresponding parts throughout the several views and in which 1 indicates an automobile of the usual or any preferred type having the usual fenders 2 provided thereon. Suitably mounted between the forward ends of said fenders forward of the radiator of the machine, is a frame consisting of the upper and lower parallel bars 3 and 4 respectively, said bars being spaced a short distance from one another and having the ends thereof jointed, pivoted, or otherwise loosely connected to the fenders. Pivotally mounted on vertical axes, between the upper and lower bars 3 and 4, are the ring-like frames 5 which are suitably spaced apart and designed to receive the head lights of an automobile. These frames may be of any desired size and are preferably provided with means for adjustably receiving head lights of various sizes therein. Formed on the rear face of each of the ring-like frames 5, at the bottoms thereof and projecting rearwardly of the same, are the arms 6 which are pivotally connected together by a cross arm 7. Formed on one of the arms 6, is an arcuate extension 8 which is bent outwardly and forwardly, the free end thereof having pivotal connection with the forward end of a linking rod 9. The rear end of this linking rod has suitable connection with the steering worm arm 10.

From the above description of the construction of my device, it will be seen that as the steering worm arm is operated to steer the vehicle, the linking rod 9 will also be operated to actuate the ring-like frames 5 and correspondingly dispose the rays of the head lights therein to the path to be taken by the forward wheels of the vehicle. In this manner, the head lights will be automatically controlled to direct their rays according to the direction to be taken by the vehicle and the usual inconvenience caused by the lack of such controlling means, will thus be obviated.

From the foregoing it will be seen that I have provided a simple and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. In a device of the class described, the combination with the fenders of an automobile; of a frame consisting of upper and lower horizontal bars, pivotally mounted at their ends to the aforesaid fenders, lamp supporting frames mounted to oscillate between the bars of said frame, and means to actuate said lamp supporting frames simultaneously.

2. In an automobile having front mud-fenders projecting beyond the radiator thereof, a frame composed of a pair of spaced apart horizontal bars, the ends of which are pivoted to the projecting portions of the mud-fenders, lamp supporting frames mounted for oscillation between the pair of bars, each frame being provided with an integral and rearwardly extending arm, the arm on one of said supporting frames terminating in an arcuate and outwardly disposed extension, connecting means between said arms to operate the frames simultaneously, and means engaged with the free end of the arcuate extension of the one arm for actuating said lamp supporting frames as the vehicle is operated.

In testimony whereof I hereunto affix signature in the presence of two witnesses.

BYRON F. MOYE.

Witnesses:
ENOS M. JOHNSON,
ALFRED HARRIS.